US007973089B2

(12) United States Patent
Sanchez et al.

(10) Patent No.: US 7,973,089 B2
(45) Date of Patent: Jul. 5, 2011

(54) MEMBRANE PREPARATION METHOD COMPRISING THE EXTRUSION OF A THERMOPLASTIC POLYMER BEARING ALKALINE GROUPINGS

(75) Inventors: Jean-Yves Sanchez, Saint Ismier (FR); Cristina Iojoiu, Grenoble (FR); Regis Mercier, Irigny (FR); Manuel Marechal, Ouveillan (FR); Nadia El Kissi, Grenoble (FR); Herve Galiano, Joue les Tours (FR); France Chabert, Paris (FR)

(73) Assignees: Institut National Polytechnique de Grenoble, Grenoble (FR); Eras-Labo, Saint Nazaire-les-Eymes (FR); Commissariat a l'Energie Atomique, Paris (FR); Centre National de la Recherche Scientifique, Paris (FR)

( * ) Notice: Subject to any disclaimer, the term of this patent is extended or adjusted under 35 U.S.C. 154(b) by 544 days.

(21) Appl. No.: 11/886,467

(22) PCT Filed: Mar. 9, 2006

(86) PCT No.: PCT/FR2006/000525
§ 371 (c)(1),
(2), (4) Date: Sep. 19, 2008

(87) PCT Pub. No.: WO2006/097602
PCT Pub. Date: Sep. 21, 2006

(65) Prior Publication Data
US 2009/0203805 A1 Aug. 13, 2009

(30) Foreign Application Priority Data

Mar. 16, 2005 (FR) ..................................... 05 02603

(51) Int. Cl.
*C08J 5/20* (2006.01)
(52) U.S. Cl. ................ 521/27; 521/28; 521/33; 521/37; 429/492; 429/493; 210/500.41

(58) Field of Classification Search .................... 521/25, 521/26, 27, 28, 30, 33, 37; 429/400, 465, 429/478, 483, 485, 491, 492, 493; 210/500.21, 210/500.23, 500.27, 500.28, 500.4; 264/48; 525/410, 424, 430, 495, 496
See application file for complete search history.

(56) References Cited

U.S. PATENT DOCUMENTS 3,341,366 A 9/1967 Hodgon, Jr. et al.
(Continued)

FOREIGN PATENT DOCUMENTS

EP 1 380 619 1/2004
(Continued)

OTHER PUBLICATIONS

P. Genova-Dimitrova, B. Baradie, D. Foscallo, C. Poinsignon and J. Y. Sanchez Ionomeric membranes for proton exchange membrane fuel cell (PEMFC): sulfonated polysulfone associated with phosphatoantimonic acid, Journal of Membrane Science 2001, 185, 59-71.*

(Continued)

*Primary Examiner* — James Seidleck
*Assistant Examiner* — Frances Tischler
(74) *Attorney, Agent, or Firm* — Merchant & Gould (57) ABSTRACT

The invention relates to a process for the extrusion of thermoplastic polymers having alkaline ionic groups.
The process consists in preparing a mixture composed of a thermoplastic polymer having alkaline ionic groups and a plasticizer, in extruding the mixture obtained to form a film; then in washing the film obtained in aqueous medium to remove said plasticizer(s). The plasticizer is chosen from non-volatile compounds which are stable with respect to the ionic groups of the polymer, which are soluble in water or in solvents that are miscible with water, said plasticizers being chosen from the compounds that react with the ionic group of the polymer via formation of a weak bond of the hydrogen bond-type, and the compounds that react with the ionic group of the polymer via formation of a strong bond, of the ionic bond-type.

9 Claims, 7 Drawing Sheets

U.S. PATENT DOCUMENTS

| | | | |
|---|---|---|---|
| 4,711,907 A | | 12/1987 | Sterzel et al. |
| 4,721,771 A | * | 1/1988 | Jansons et al. ............... 528/222 |
| 2003/0187081 A1 | | 10/2003 | Cui |
| 2006/0102869 A1 | | 5/2006 | Cavaille et al. |

FOREIGN PATENT DOCUMENTS

| | | |
|---|---|---|
| FR | 2 841 255 | 12/2003 |
| WO | WO 02/092673 | 11/2002 |

OTHER PUBLICATIONS

International Search Report, International Application No. PCT/FR2006/000525, dated Mar. 8, 2006.

* cited by examiner

MEMBRANE PREPARATION METHOD COMPRISING THE EXTRUSION OF A THERMOPLASTIC POLYMER BEARING ALKALINE GROUPINGS

The present invention relates to a process for preparing membranes composed of a thermoplastic polymer bearing alkaline ionic groups.

BACKGROUND OF THE INVENTION

It is known that polymers bearing ionic groups may be used for producing membranes for fuel cells. The ionic groups may be acid groups or alkaline groups.

It is also known how to prepare polymer films either by casting from a solution of the polymer in a volatile solvent, or by extrusion. Extrusion is advantageous, since it makes it possible to avoid the use of volatile solvents, which may be flammable.

A polymer may be extruded on condition that it has a thermal stability such that the polymer is not degraded at the temperature required for the extrusion, which depends on the glass transition temperature.

The comparison of the thermal stability of a polymer having a given backbone that does not bear ionic groups with the thermal stability of a polymer which has the same backbone but which bears ionic groups shows that the polymer with ionic groups has a lower thermal stability. The degradation temperature is therefore lower and it is generally incompatible with the temperature required for extrusion, which depends on the glass transition temperature.

It is known to lower the glass transition temperature of a polymer by mixing it with a plasticizer, to enable extrusion without thermal degradation, the plasticizer then being removed after extrusion. The polymers that have been extruded by this process are polymers which do not bear ionic groups. As plasticizers used for the extrusion of thermoplastic polymers, mention may be made of chlorinated or non-chlorinated paraffins, carboxylic esters (such as adipates, benzoates, citrates and phthalates), phosphoric esters, and toluene disulfonamides. For example, H. H. Kausch, et al., (Traité des Matériaux (Materials Compendium), volume 14, Presses Polytechniques et Universitaires Romandes, Lausanne, 2001) describe the extrusion of polystyrene after incorporating organic agents as plasticizer.

The inventors have then envisaged preparing films of polymers bearing alkaline ionic groups by subjecting a polymer and plasticizer mixture to extrusion, then by removing the plasticizer from the film obtained by extrusion. However, it has turned out that, among the many compounds known as plasticizers for extruding polymers without ionic groups, all were unable to be used with a polymer having alkaline groups. For example, the paraffins had little affinity for the ionic groups.

The work of the inventors has thus enabled them to define a family of compounds that can be used as plasticizers for polymers bearing alkaline ionic groups, said plasticizers lowering the glass transition temperature and allowing an extrusion temperature that remains below the degradation temperature of the polymer.

SUMMARY OF THE INVENTION

The subject of the present invention is consequently a process for preparing a membrane by extruding a thermoplastic polymer bearing alkaline ionic groups, and also the membranes obtained.

The process according to the invention consists in preparing a mixture composed of a polymer having alkaline ionic groups and of at least one plasticizer, in extruding the mixture obtained to form a film, then in washing the film obtained in aqueous medium to remove said plasticizer(s). It is characterized in that the plasticizer(s) is (are) chosen from non-volatile compounds which are stable with respect to the ionic groups of the polymer, which are soluble in water or in solvents that are miscible with water, and which bear groups chosen from:
  groups having a strong affinity for the alkaline cations of the ionic groups borne by the polymer; and
  groups having a strong affinity for the anionic part of the ionic groups borne by the polymer.

BRIEF DESCRIPTION OF THE DRAWINGS

FIG. 6 shows the behavior of the mixture at 160° C., 180° C. and 200° C.

FIG. 9 shows the behavior of the mixture at 140° C., 160° C., 180° C. and 200° C.

DETAILED DESCRIPTION OF THE PREFERRED EMBODIMENTS

In general, the compounds bearing groups having a strong affinity for the anionic part of the ionic groups borne by the polymer also have a certain affinity, that is more or less strong, for the alkaline cations of said ionic group.

The expression "non-volatile compound" is understood to mean a compound of which the boiling point temperature is above the maximum extrusion temperature of the polymers, preferably >200° C.

The affinity for the cations and the affinity for the anionic part of the ionic groups may be evaluated respectively by the donor nature or the accepter nature defined in the "Donor Number" and "Accepter Number" scales defined by Gutman, and published in C. Reichardt, "Solvents and solvent effects in organic chemistry", 2$^{nd}$ Edition, VCH, 1990.

The process proposed may be used for producing membranes from a thermoplastic polymer whose chain is composed of identical or different repeating units, each repeating unit comprising at least one functional group and at least one mononuclear or polynuclear aromatic group, the functional group being chosen from ester, ketone, ether, sulfide, sulfone, benzoxazole, amide and imide groups, at least some of the aromatic groups bearing an alkaline ionic group.

The ionic group, represented by the formula -A$^{p-}$(M$^+$)$_p$ in which A represents the anionic part of the ionic group, p represents the valency of the anionic part and M represents an alkali metal, may be chosen from all the ionic groups sufficiently dissociated in the reaction medium. By way of example, mention may be made of the —O$^-$M$^+$ groups, sulfonate —SO$_3^-$M$^+$ groups, sulfate —OSO$_3^-$M$^+$ groups, carboxylate —CO$_2$M$^+$ groups, thiocarboxylate —C(=S)O$^-$M$^+$ groups, dithiocarboxylate —CS$_2^-$M$^+$ groups, phosphonate —PO$_3^{2-}$(M$^+$)$_2$ groups, sulfonylamide —SO$_2$NH$^-$M$^+$ groups and sulfonylimide (X—SO$_2$NSO$_2$—)$^-$M$^+$ groups in which X is an alkyl group preferably having from 1 to 6 carbon atoms, a perfluorinated or partially fluorinated alkyl group preferably having from 1 to 6 carbon atoms, an alkenyl group preferably having from 1 to 6 carbon atoms, a perfluorinated or partially fluorinated alkenyl group preferably having from 1 to 6 carbon atoms, an oxyalkylene CH$_3$—(O—(CH$_2$)$_m$)$_n$ group in which preferably 2≦m≦5 and 1≦n≦10, or an aryl group comprising one or more fused or unfused aromatic rings and optionally bearing a substituent.

The process is particularly advantageous for polymers in which the content of ionic groups is greater than or equal to 1 mol/kg of polymer.

As examples of thermoplastic polymers, mention may be made of the polymers which comprise segments chosen from the following segments in which the functional group -A$^{p-}$(M$^+$)$_p$ represents any of the above ionic groups, and the indices n, m, x and y each represent a number of repeating units:

a polyether of which certain repeating units bear an alkaline ionic group, for example a polyphenylene oxide corresponding to the formula I, in which R and R$_1$ represent, independently of one another, H, an alkyl group preferably having from 1 to 5 carbon atoms, an alkenyl group preferably having from 2 to 5 carbon atoms, or an aryl group comprising one or more fused or unfused aromatic rings and optionally bearing a substituent:

(I)

a polyetheretherketone which is composed of units comprising ether functions and ketone functions in the chain, and of which certain units bear an alkaline ionic group, for example a polyether corresponding to the formula II below:

(II)

a polyetherketone which is composed of units comprising ether functions and ketone functions in the chain, and of which certain units bear an alkaline ionic group, for example a polyether corresponding to the formula III below:

(III)

a polybenzoxazole of which certain units bear an alkaline ionic group, for example a polymer whose repeating unit corresponds to the formula IV below:

(IV)

a polyamic acid of which certain units bear an alkaline ionic group, and which is converted to a polyimide by the heat of extrusion, for example the polyimide V below:

(V)

a polyimide corresponding to the formula V;
a polyparaphenylene, for example comprising units corresponding to the formula VI:

(VI)

such as poly(4-phenoxybenzoyl-1,4-phenylene) sold by Maxdem Inc. under the name "POLY-X200";
a polyphenylene sulfide, for example a polymer whose repeating unit (VIII) corresponds to the following formula:

(VII)

a polyether sulfone, for example a polymer corresponding to the formula VIII below in which $R_2$ represents a single bond or a —C(CH$_3$)— group:

(VIII)

One particular family of polymers is composed of polymers that comprise segments chosen from the segments below, in which the ionic group is —SO$_3$M, M being Na, Li or K. They are represented by the following formulae:

(Ia)

(IIa)

(IIIa)

(IVa)

(Va)

In the above formulae, the indices n, m, x and y each represent a number of repeating units and they are chosen so that the molecular weight of the polymer is preferably between 20,000 g/mol and 500,000 g/mol, and so that the ion exchange capacity IEC is greater than 0.8 W/kg.

The compounds that can be used as plasticizer due to their high affinity with the alkaline cations may be chosen from:
  ethers which have a high boiling point, for example above 200° C. It is possible to use oligoethers which optionally have terminal $CH_3$, OH or $NH_2$ groups, for example an oligooxyethylene-α,ω-diol (OED) with a weight of 400 g/mol (OED-400) or with a weight of 200 g/mol (OED-200);
  sulfones $R^3$—$SO_2$—$R^4$ in which $R^3$ and $R^4$ represent, independently of one another, an alkyl having from 1 to 3 carbon atoms, or an aryl comprising one or more fused or unfused aromatic rings (example a phenyl group, a tolyl group or a naphthyl group), or else $R^3$ and $R^4$ together form a biradical (for example, —$R^3$—$R^4$— represents —$CH_2CH_2CH_2CH_2$—) to form a ring with the $SO_2$ group giving a sulfolane;
  carboxylic amides corresponding to the formula HCONR$^6$R' in which $R^6$ and $R^7$ represent alkyl groups having from 1 to 4 carbon atoms, for example dimethylformamide; and
  sulfonic amides such as tetraalkylsulfamides (for example tetraethylsulfamide) of formula $(C_2H_5)_2N$—$SO_2$—$N(C_2H_5)_2$.

The compounds that can be used as plasticizer due to their affinity for the anionic part of the ionic groups (and which simultaneously have a more or less strong affinity for the cations) are compounds which have a high boiling point (preferably above 200° C.) and a high (preferably above 200° C.) thermal stability, and which bear protic functional groups such as, for example, carboxylic amide functional groups and sulfonic amide functional groups (that is to say, sulfamides) which bear 1 or 2 hydrogen atoms on the nitrogen atom, alcohol, thiol, phenol, primary amine and secondary amine functional groups. These compounds may be chosen from:
  alcohols chosen from the group composed of alkanols having at least 2 carbon atoms, polyols derived from alcanes by replacing at least two hydrogen atoms with an OH group [for example, sorbitol HO—$CH_2$—[CH(OH)]$_4$—$CH_2OH$, pentaerythritol $C(CH_2OH)_4$ and glycerol HO—$CH_2$—CH(OH)—$CH_2OH$], and compounds having ether groups [for example, co-hydroxy-oligo(oxyethylene) corresponding to the formula $R^5$—($OCH_2$—$CH_2)_n$—OH in which $R^5$ is H or $CH_3$ and n=1 to 100, preferably 3 to 30];
  monoamine, diamine or triamine oligomers (for example the compounds sold under the name JEFFAMINE® by Texaco) and in which the nitrogen atom bears from 1 to 2 oligo(oxyethylene) groups;
  sulfamide $H_2N$—$SO_2$—$NH_2$, sulfonamides $R^8$—$SO_2NH_2$ in which $R^8$ is an alkyl group which has from 1 to 5 carbon atoms, or an aryl group comprising one or more fused or unfused aromatic rings (for example a phenyl group, a tolyl group or a naphthyl group); and
  primary or secondary amides, for example formamide or methylformamide.

A plasticizer compound corresponding to the definitions given above may be introduced alone into the polymer to be extruded, or in the presence of a compound acting as a plasticizer for the polymer backbone, on condition that the two compounds are miscible.

The mixture of ionic thermoplastic polymer and plasticizer subjected to the extrusion may contain, in addition, a filler which may be chosen from fillers intended to improve the mechanical strength of the polymer film obtained after extrusion, and fillers intended to confer other properties to the final material. A filler intended to improve the mechanical strength may be chosen from glass fibers, carbon fibers, carbon nanotubes, cellulose microfibrils, alumina fibers and polyaramid fibers, sold under the name "KEVLARc)". A filler intended to improve the hydrophilicity of the film obtained after extrusion, and consequently its conductivity, is phosphatoantimonic acid (H3).

A polymer of the sulfonated polysulfone type corresponding to the formula (VIIIa)

may be obtained from polymers sold by Solvay, respectively under the names UDEL® when $R_2$ represents a —$C(CH_3)_2$— group and RADEL® when $R_2$ represents a single bond. These polymers have a similar structure to that of the polymers (VIIIa) above, but they do not bear any ionic groups. The process for preparing the polymer (VIIIa) from the UDEL or RADEL precursor polymer (Ip) comprises the following steps:
1. preparing an anhydrous solution of the polymer (Ip) in a solvent chosen from chlorinated organic solvents (for example, dichloroethane DCE, tetrachloroethane TCE or dichloromethane DCM) or chloroform;
2. preparing an anhydrous solution of trimethylsilyl chlorosulfonate, which is the sulfonation reactant;
3. bringing the two anhydrous solutions into contact, with vigorous stirring, for a duration of a few hours at a temperature between 30° C. and 65° C., under argon;
4. extracting the sulfonated polymer in a 1 mol/L ethanolic sodium hydroxide solution by precipitation followed by filtration;
5. filtering the polymer in sodium salt form and washing with water to a neutral pH; and
6. drying the sulfonated polymer, sodium salt, under dynamic vacuum, at a temperature between 40° C. and 80° C., for example at 50° C.

The present invention is illustrated by the following examples, to which it is not however limited.

In the examples, various samples were subjected to analyses by differential scanning calorimetry, using a machine sold, by TA Instruments under the name DSC. The method of heating the sample separated the components of the total heat flow into a signal called a reversible signal and another signal called an irreversible signal. On the thermogram obtained:
the curve representing the reversible signal corresponds to reversible thermal transitions such as the glass transition, and the curve representing the irreversible signal corresponds to irreversible thermal transitions such as melting or crystallization;
the curve with the solid line represents the total heat flow, the curve with short dots represents the reversible signal and the curve with long dashes represents the irreversible signal; and
the energy Q (in W/g of polysulfone) is represented on the y-axis and the temperature T on the x-axis.

Example 1 relates to the preparation of sulfonated polysulfones bearing ionic groups.

Example 1

Preparation of a Sulfonated Polysulfone, Sodium Salt

During a first step, an anhydrous solution of UDEL® polymer was prepared by dissolving 1600 g (3.62 mol) of UDEL® polymer in 16 l of DCE at 50° C., then by drying the solution by azeotropic distillation until 1 l of DCE was removed.

At the same time, an anhydrous solution of trimethylsilyl chlorosulfonate was prepared by dissolving 472 g (4.34 mol) of trimethylsilane chloride and 422 g (3.6 mol) of chlorosulfonic acid (ClSO$_3$H) in 500 ml of dry DCE with magnetic stirring and under argon, all the constituents being anhydrous, for a duration of 2 h, the HCl formed being trapped.

During a second step, the two anhydrous solutions were mixed under an argon purge and the mixture was kept at 35° C. with vigorous stirring for 17 h.

During a third step, the solution was precipitated in ethanol containing 1 mol/l of NaOH. The precipitate formed was separated by filtration, and it was washed three times with ethanol, then with distilled water to a neutral pH. The precipitate was then dried in air at 20° C. for a duration of 24 h, then under a pressure of 20 mbar at 55° C. for a duration of 72 h. The sulfonated polymer thus obtained (PSUSNa) had a degree of sulfonation (ion-exchange capacity IEC) of 0.64H$^+$/mol (1.3 meq/g).

Figure 1:
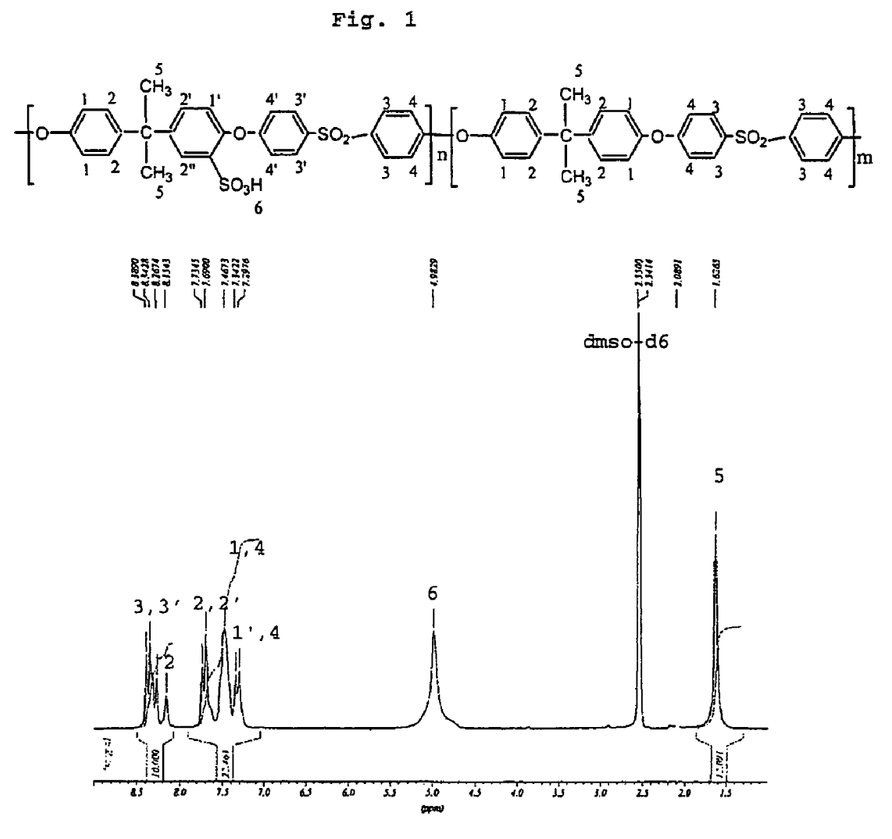
FIG. 1 represents the $^1$H NMR spectrum of the sulfonated polysulfone of Example 1.
Figure 2:
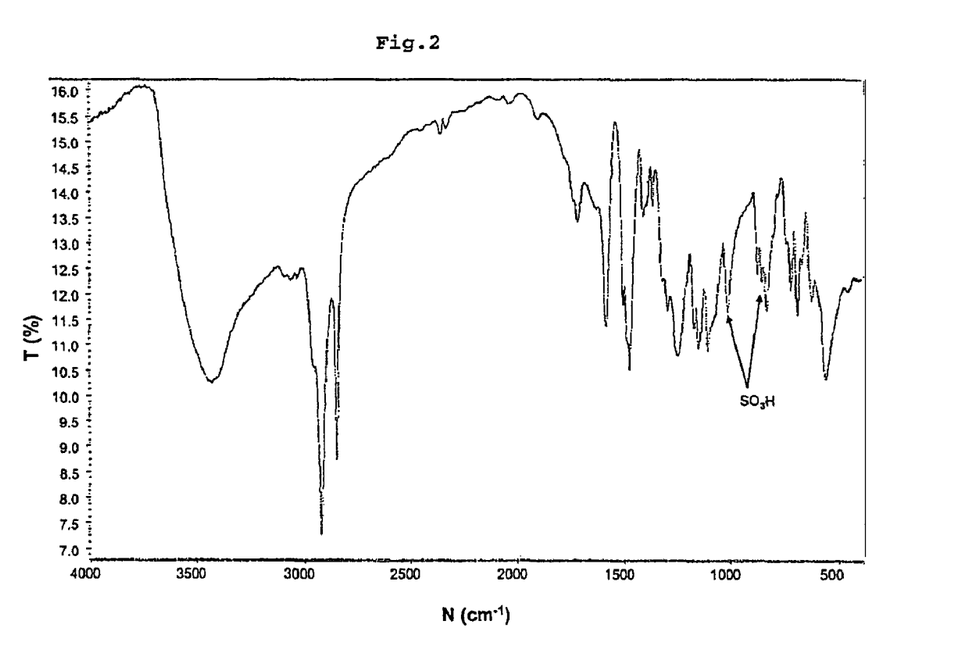
FIG. 2 represents the IR spectrum of the sulfonated polysulfone of Example 1.

The IECs of the sulfonated polymers were determined by three techniques: $^1$H NMR, infrared spectroscopy and acid-base titration. The acid-base titration was carried out after immersion of the polymer in the sodium salt form in a 1 mol/l solution of hydrochloric acid for 12 hours at room temperature to exchange the sodium with proton. The sulfonated polymer in acid form is then filtered and dried under vacuum at 50° C. for 24 h. 1 g of dry polymer is dissolved in 100 ml of diethylene glycol monomethyl ether (DGME) and dosed, in the presence of a colored indicator (Methyl Orange), with a 2.5×10$^{-3}$ mol/l solution of sodium hydroxide in DGME. FIG. 1 represents the $^1$H NMR spectrum and FIG. 2 represents the IR spectrum. In FIG. 2, T denotes the transmission and N denotes the wavenumber.

Figure 3:
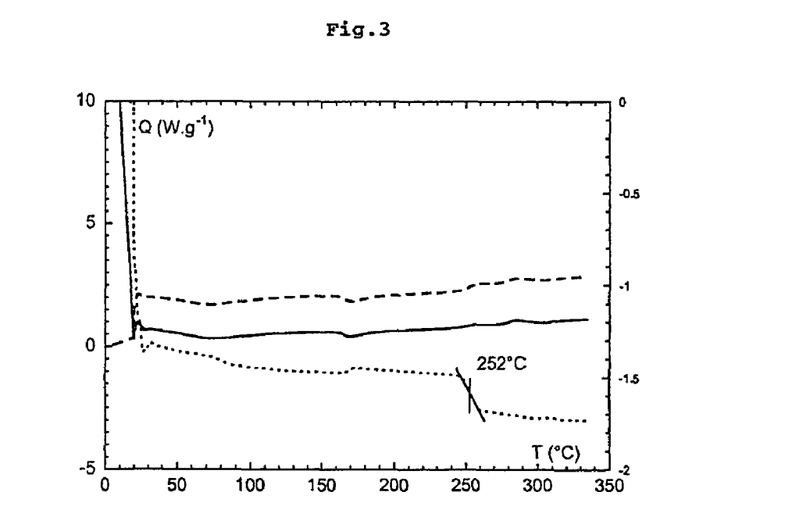
FIG. 3 represents the DSC thermogram of the sulfonated polysulfone of Example 1.

The DSC thermogram of the polysulfone is represented in FIG. 3, and it shows that the melting point is 252° C.

Examples 2 to 4

Examples 2 to 4 demonstrate the extrudability of various compositions containing a sulfonated polysulfone and a plasticizer, and describe the production of membranes. They describe tests of dynamic rheometry and extrusions carried out with a Gottfert 1500 capillary rheometer. Dynamic rheometry, with the use of time-temperature equivalence, Makes it possible to characterize the blends under the shear gradient conditions that they undergo in an extruder. The capillary rheometer, due to its handleability and moderate amounts of polymer consumed, is well suited to a study of extrudability. The data obtained by the two types of rheometry tests are representative of an extrusion in a single-screw or twin-screw extruder.

Example 2

Sulfonated Polysulfone/Sorbitol

This example was carried out using a fraction, known as PSUSNA, of a polysulfone obtained according to the procedure from Example 1, and sorbitol as a plasticizer. PSUSNA denotes the product composed of particles having a size of less than 300 obtained by milling the polysulfone obtained according to Example 1, then screening to a size of less than 300 μm.

Figure 4:
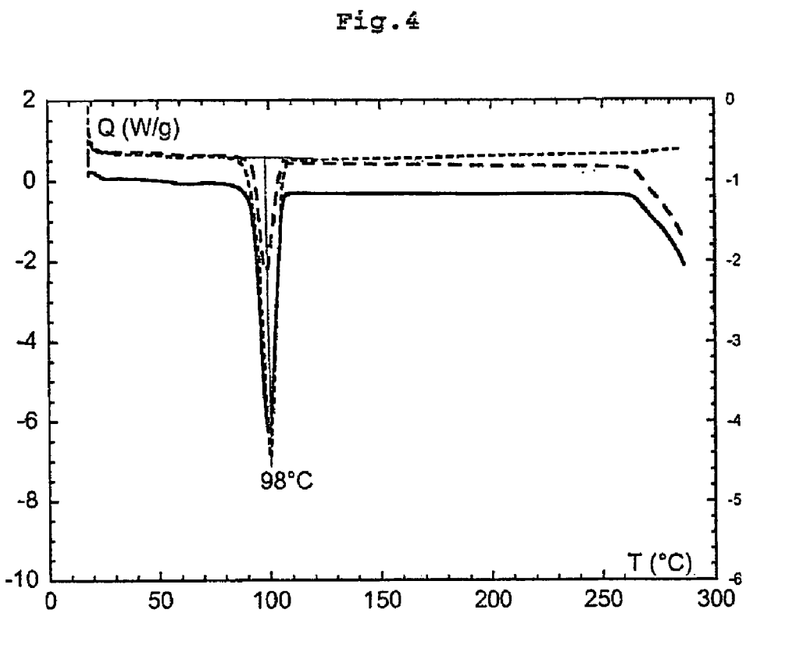
FIG. 4 represents the DSC thermogram of the sorbitol plasticizer of Example 2.

FIG. 4 represents the DSC thermogram of the sorbitol and it shows that the sorbitol has a melting point of 98° C. (inflexion point on the curve of the irreversible signal).

The PSUSNA/sorbitol mixture (in a weight ratio of 40/60, corresponding to a volume ratio of 44/56) was produced in a Rheomix mixer from Haake comprising a 70 cm$^3$ chamber and 25 mm diameter counter-rotating rotors. The chamber was surmounted by a hopper via which the filling was carried out. The temperature of the mixer was set at 180° C. The rotational speed of the rotors was fixed at 80 rpm, which corresponded to an average shear of 80 s$^{-1}$.

8.8 g of PSUSNA and 18.6 g of sorbitol were weighed separately to within 1 mg, then they were premixed by mechanical stirring before being poured into the hopper of the mixer. The rotors were activated for 20 minutes. The product obtained was a transparent liquid of amber color, that was not very viscous at the temperature for producing the mixture, namely 180° C. At room temperature, the product became soft.

Figure 5:
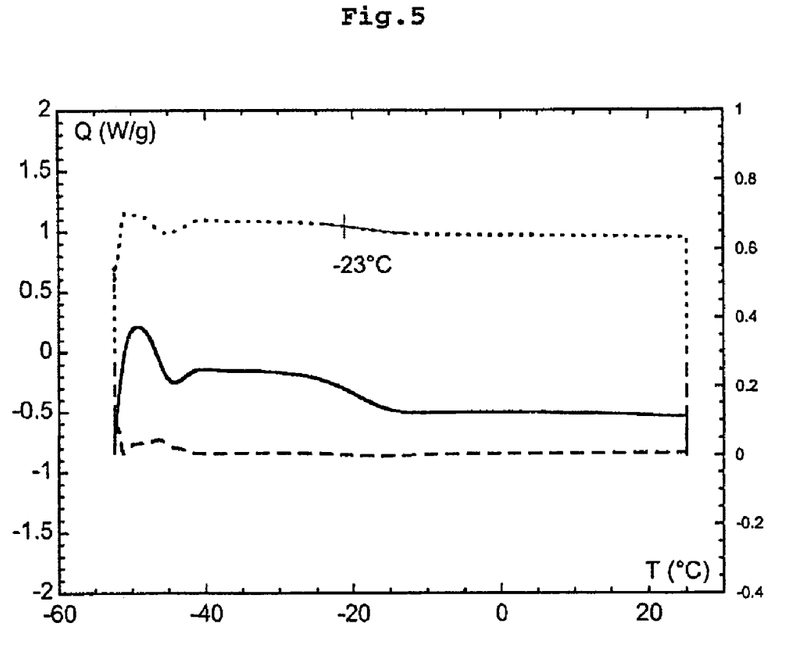
FIG. 5 represents the DSC thermogram of the PSUSNA/sorbitol mixture of Example 2.

FIG. 5 represents the DSC thermogram of the mixture. It shows that the glass transition temperature was −23° C.

The PSUSNA/sorbitol mixture obtained was milled in a mechanical cutting mill (sold under the trademark IKA) equipped with a 2 mm sieve. The grains recovered after milling were placed in a ventilated oven at 60° C. for 4 hours to remove the water which would hamper the extrusion.

Figure 6:
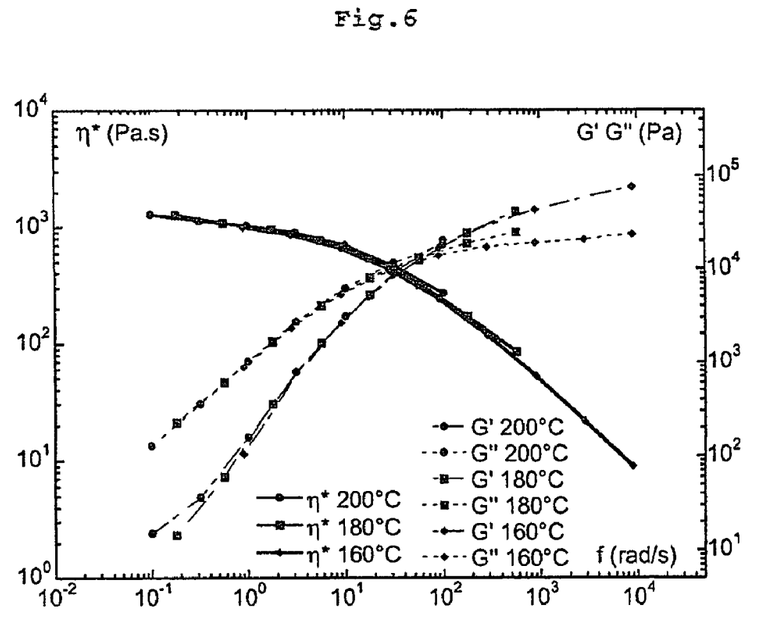
FIG. 6 shows that the viscosity of the PSUSNA/sorbitol mixture of Example 2 characterized in dynamic rheometry with an ARES rheometer from Rheometrics, from 160 to 200° C. and for shear gradients between $10^{-1}$ and $10^2$ s$^{-1}$.

In order for a composition to be extrudable, it is necessary that its viscosity is low enough so that the composition flows at the extrusion temperature. The viscosity of the PSUSNA/sorbitol mixture was characterized in dynamic rheometry with an ARES rheometer from Rheometrics, from 160 to 200° C. and for shear gradients between $10^{-1}$ and $10^{2}$ s$^{-1}$. From these viscosity measurements, the behavior of the mixture during extrusion was provided by the principle of the time-temperature superposition. FIG. 6 shows the behavior of the mixture at 160° C., 180° C. and 200° C. On the y-axis, $\eta^*$ represents the viscosity, and on the x-axis, f represents the strain frequency of the sample. The curves with thin lines represent the elastic modulus or the storage modulus G' and the viscous modulus or loss modulus G". The curves with thick lines represent the viscosity $\eta^*$.

These curves show that, for shears that are representative of the extrusion, the viscosity of the PSUSNA/sorbitol mixture is close to 10 Pa·s at $10^4$ s$^{-1}$, which is very low. The mixture may therefore be extruded.

A film was prepared by extruding a PSUSNA/sorbitol mixture using the Gottfert 1500 capillary rheometer. This rheometer comprised a heating reservoir into which the mixture was introduced. A piston pushed the molten mixture through a sheet die having a thickness of 0.8 mm. The extrusion temperature, which had to be above the glass transition temperature of the polymer flowed, but below the evaporation temperature of the plasticizer was 200° C. in the present case. The thickness of the film on exiting the die was 0.8 mm, and drawing of the film allowed its thickness to be decreased to 0.1 mm.

The film was then cooled to room temperature. It was transparent and its surface did not have any defects.

The film was then submerged in a 0.5 mol/l solution of hydrochloric acid for 24 hours at room temperature to remove the plasticizer which dissolved in the water and to acidify the membrane. An NMR analysis of the material after drying made it possible to check that the plasticizer had been completely removed, the NMR spectrum being identical to the spectrum of the starting polysulfone represented in FIG. 1.

The electrochemical results were obtained by impedance measurements in an electrochemical cell in which the film constitutes the electrolyte and it is placed between two gold electrodes, by applying a low-amplitude sinusoidal voltage to the cell, around its equilibrium voltage. The proton conductivity of the film, measured at 20° C. and 90% humidity, was equal to 140 mS/cm.

Example 3

Sulfonated Polysulfone/Polyol

This example was produced using the PSUSNA compound used in Example 2, and a polyol as a plasticizer. The mixture contained 75% by weight, namely 72% by volume, of polysulfone.

Figure 7:
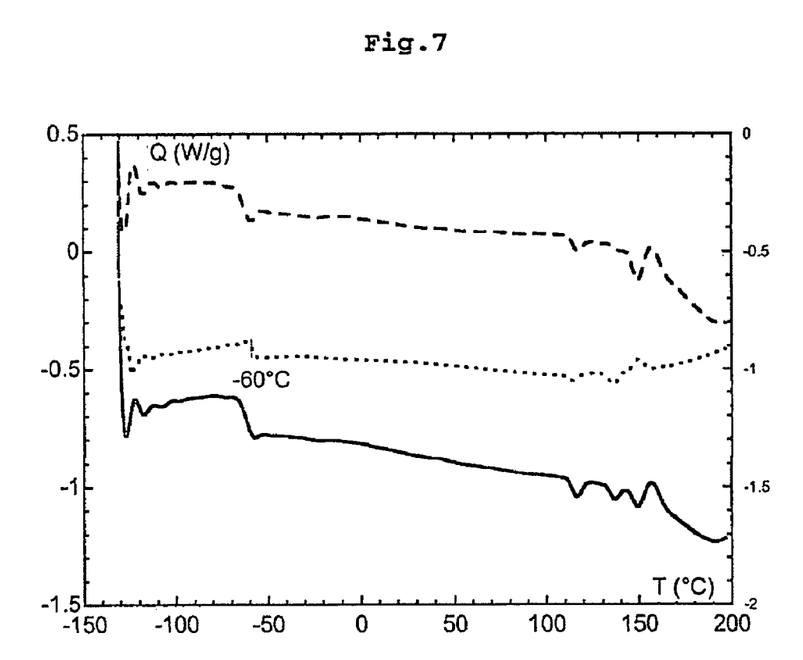
FIG. 7 represents the DSC thermogram of the polyol sold under the name ET570 by Shell, used as a plasticizer in Example 3.

The plasticizer was the polyol sold under the name ET570 by Shell. Its melting point, determined by DSC, was −60° C., as shown in FIG. 7, which represents the DSC thermogram of the polyol.

The PSUSNA/polyol mixture was produced in a Rheomix mixer the same as that used in Example 2. The temperature of the mixer was set at 180° C. The rotational speed of the rotors was fixed at 80 rpm, which corresponded to an average shear of 80 s$^{-1}$.

22.56 g of PSUSNA and 7.54 g of imidazole were weighed separately to within 1 mg, then they were premixed by mechanical stirring before being poured into the hopper of the mixer. The rotors were activated for 20 minutes. The product obtained was a transparent liquid, of light brown color, that was not very viscous at the temperature for producing the mixture, namely 180° C. At room temperature, the product became a solid, it was homogeneous to the naked eye.

Figure 8:
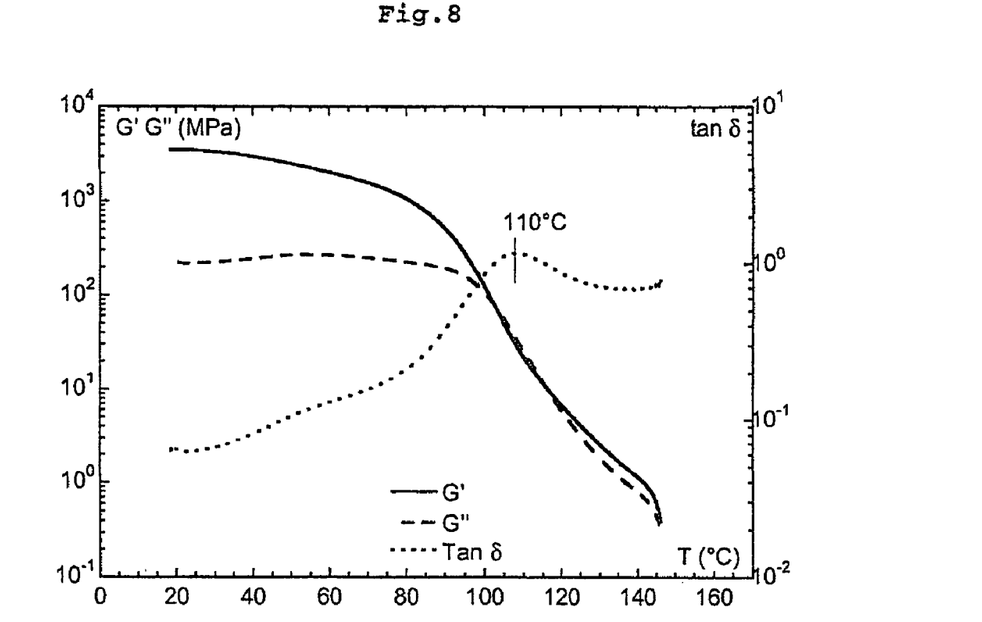
FIG. 8 represents the DSC thermogram of the PSUSNA/polyol mixture of Example 3.

The glass transition of the mixture was determined by DSC. FIG. 8 represents the DSC thermogram of the mixture, and it shows that the glass transition temperature was 180° C.

The PSUSNA/polyol mixture was milled in a mechanical cutting mill (sold under the trade mark IKA) equipped with a 2 mm sieve. The grains recovered after milling were placed in a ventilated oven at 80° C. for 4 hours to remove the water which would hamper the extrusion.

Figure 9:
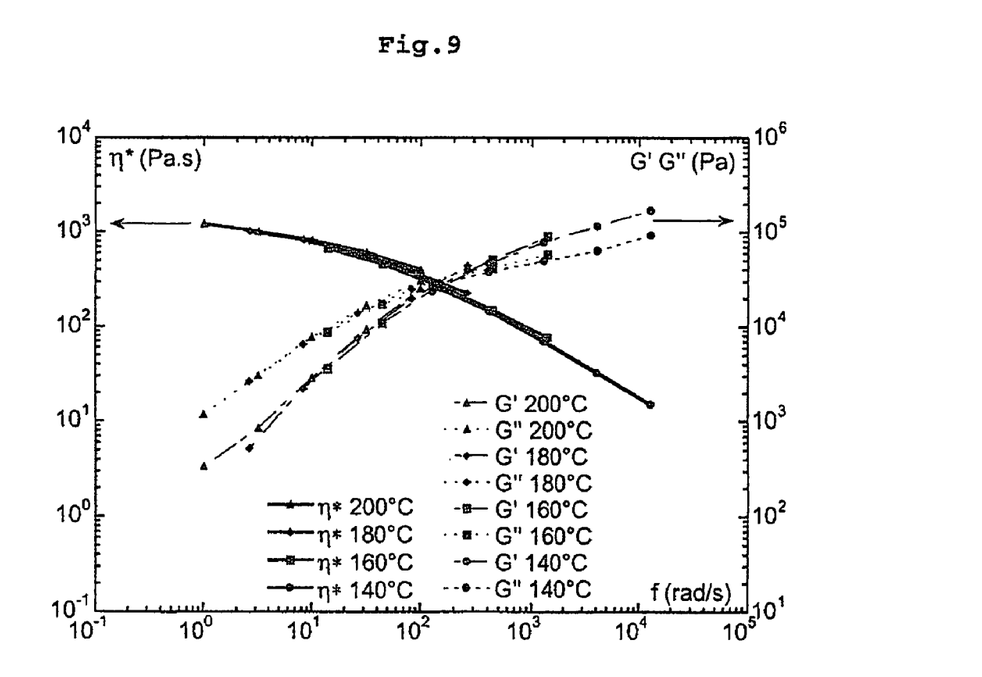
FIG. 9 shows that the viscosity of the PSUSNA/polyol mixture of Example 3 characterized in dynamic rheometry with an ARES rheometer from Rheometrics, from 140° C. to 200° C. and for shear gradients between $10^{-1}$ and $10^2$ s$^{-1}$.

The viscosity of the PSUSNA/polyol mixture was characterized in dynamic rheometry with an ARES rheometer from Rheometrics, from 140° C. to 200° C. and for shear gradients between $10^{-1}$ and $10^{2}$ s$^{-1}$. FIG. 9 shows the behavior of the mixture at 140° C., 160° C., 180° C. and 200° C. On the y-axis $\eta^*$ represents the viscosity and on the x-axis f represents the strain frequency of the sample. The curves with a thin line represent the elastic modulus or storage modulus G' and the viscous modulus or loss modulus G". The curves with a thick line represent the viscocity $\eta^*$. At 200° C., the mixture is a shear-thinning mixture, and its viscosity is 10 Pa·s at $10^4$ s$^{-1}$, which is very low. The mixture may therefore be extruded.

A film was prepared by extruding a PSUSNA/polyol mixture using the abovementioned Gottfert 1500 capillary rheometer. The extrusion temperature chosen in the present case was 200° C. The thickness of the film exiting the die was 0.8 mm, and drawing the film made it possible to decrease its thickness to 0.1 mm.

The film was then cooled to room temperature. It was transparent and its surface did not have any defects.

The film was then submerged in a 0.5 mol/l solution of hydrochloric acid for 24 hours at room temperature to remove the plasticizer which dissolved in the water and to acidify the membrane.

As in Example 2, the electrochemical results were obtained by impedance measurements in an electrochemical cell to which a low-amplitude sinusoidal voltage, around its equilibrium voltage, was applied. The proton conductivity of the film, measured at 20° C. and 98% humidity, was equal to 30±6 mS/cm.

Example 4

Sulfonated Polysulfone/OED-400/H3

This example was carried out using the PSUSNA compound used in Example 2, and an oligooxyethylene-α,ω-diol with a weight of 400 g/mol as a plasticizer, and phosphatoantimonic acid H3 as a filler. The mixture contained 33% by weight, namely 32% by volume, of plasticizer. In the PSUSNA+H3 fraction, H3 represented 10% by volume relative to PSUSNA.

Figure 10:
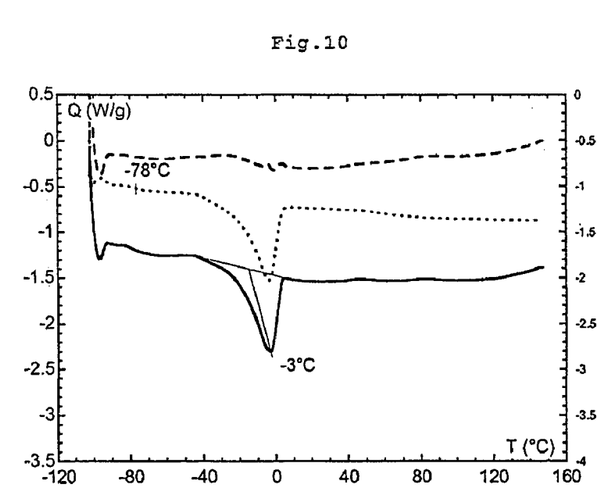
FIG. 10 represents the DSC thermogram of an oligooxyethylene-α,ω-diol with a weight of 400 g/mol, used as a plasticizer in Example 4.

OED-400 had a glass transition temperature, determined by DSC, of −78° C., as shown in FIG. 10, which represents the DSC thermogram of the polyol.

The PSUSNA/OED-400/H3 mixture was produced in a Rheomix mixer the same as that used in Example 2. The temperature of the mixer was set at 120° C. The rotational speed of the rotors was fixed at 80 rpm, which corresponded to an average shear of 80 s$^{-1}$.

39.56 g of PSUSNA, 16.95 g of OED-400 and 7.05 g of H3 were weighed separately to within 1 mg, then they were premixed by mechanical stirring before being poured into the hopper of the mixer. The rotors were activated for 20 minutes.

The product obtained was a transparent liquid, of pale yellow color that was not very viscous at the temperature for producing the mixture, namely 120° C. At room temperature, the product became a solid, it was homogeneous to the naked eye and to the scanning electron microscope.

The PSUSNA/OED-400/H3 mixture was milled in a mechanical cutting mill (sold under the trade mark IKA) equipped with a 2 mm sieve. The grains recovered after milling were placed in a ventilated oven at 60° C. for 4 hours to remove the water which would hamper the extrusion.

A film was prepared by extruding a PSUSNA/OED-400/H3 mixture using the abovementioned Gottfert 1500 capillary rheometer. The extrusion temperature chosen in the present case was 120° C. The thickness of the film exiting the die was 0.8 mm, and drawing the film made it possible to decrease its thickness to 0.1 mm.

The film was then cooled to room temperature. It was transparent and its surface did not have any defects.

The film was then submerged in a 0.5 mol/l solution of hydrochloric acid for 24 hours at room temperature to remove the plasticizer which dissolved in the water and to acidify the membrane.

Examples 5 to 7

In these examples the extrusion was carried out using an extruder sold by DACA under the trademark Microcompounder.

Figure 11:
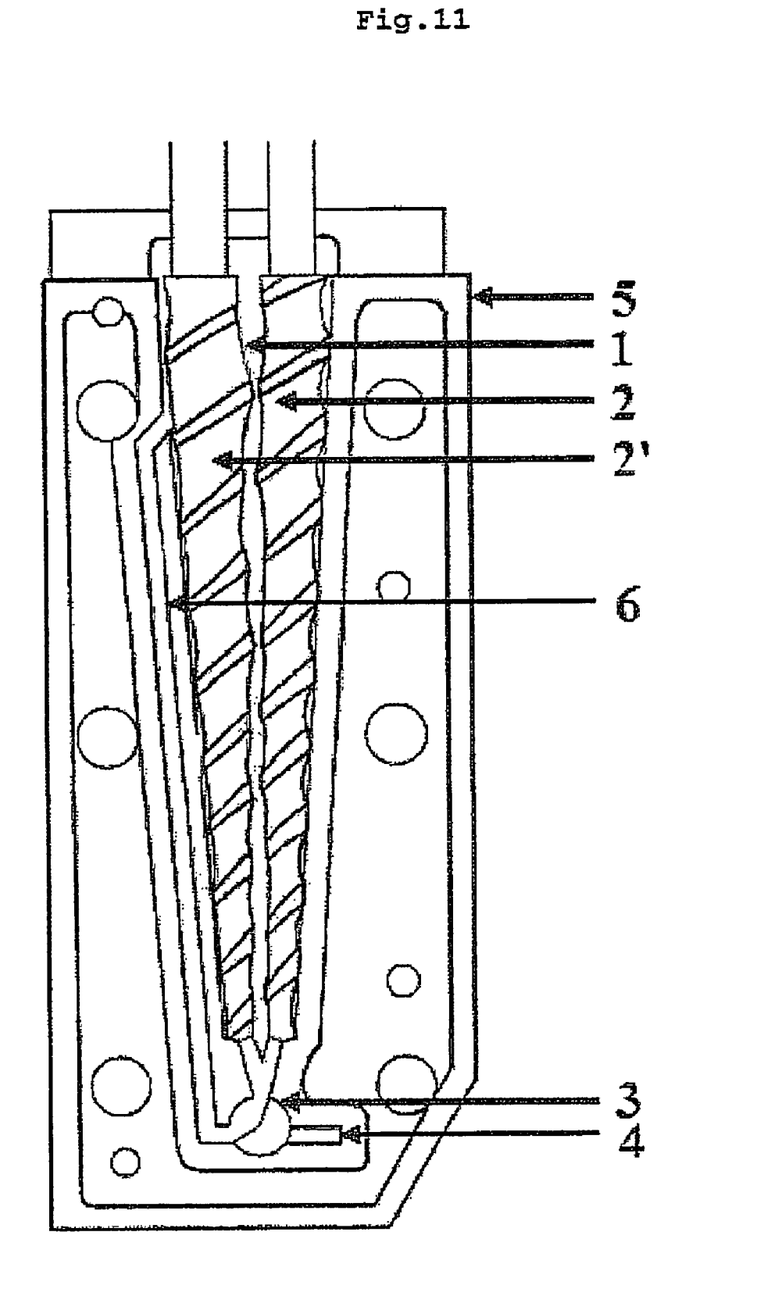
FIG. 11 shows a front view of one of the plates (5) of the extruder, used to extrude the polymer/plasticizer mixtures, as seen when the extruder is open for cleaning.

The body of the extruder was formed from two similar plates that were assembled together. FIG. 11 shows a front view of one of the plates (5) as seen when the extruder is open for cleaning. It comprises a barrel (1) in which two counter-rotating conical screws (2, 2') are placed, heating cartridges (not shown) inserted into the two plates so as to maintain a homogeneous temperature in the barrel, a temperature sensor (not shown), a torque sensor (not shown), a two-way valve (3), an interchangeable die 4, and a channel (6) connecting the lower part of the barrel to the upper part.

The volume of the barrel (1) was 4.5 cm$^3$.

The 2 counter-rotating conical screws (2,2') had a length of 100 mm and a maximum diameter of 10 mm. Their rotational speed could vary from 0 to 360 rpm. In the present example, the speed was 100 rpm, which represented an average shear of around 1500 s$^{-1}$, that is to say a shear representative of industrial extrusion conditions.

The two-way valve (3) could either be in "recycling" position, which enabled the material at the end of the screw to go back up to re-enter the barrel, or in "extrusion" position, in order to let the material exit through the die. In the figure, the valve (3) is in the "recycling" position.

The interchangeable die (4) used in the present example was a 2 mm diameter axisymmetric die. In the Microcompounder extruder, the extrusion was carried out under the following conditions. The plates of the extruder were set at a given temperature Te. The mixture to be extruded was placed into a feed hopper, and pushed into the barrel with a piston. Inside the barrel, the two co-rotating screws mixed and melted the material, and forced it to the bottom. When the material reached the bottom of the barrel, it went back up via the outer channel (6) then re-entered the barrel to be mixed. This process could be repeated several times, for a duration De. The temperature of the polymer/plasticizer mixture was measured in real time by the temperature sensor. A torque sensor (not shown) measured the resistance Re created by the material during the rotation of the screws, in the range of 0 to 5 N·m. At the end of the mixing process the valve was turned to the extrusion position, in order to let the material exit through the die (4).

Example 5

Sulfonated Polysulfone/Sorbitol

This example was carried out using the PSUSNA compound used in Example 2, and sorbitol as a plasticizer. The mixture contained 60% by weight, namely 56% by volume, of plasticizer.

The extrusion was carried out with 4.02 g of PSUSNA/sorbitol mixture, with a plate temperature Te of 180° C., and a duration De of 5 min.

The temperature of the mixture, measured in real time by the temperature sensor, remained at 180° C., which signified that the mixture was not overheated. The torque measured was 1.2 N·m., which is to say that the material flowed easily. At the end of the mixing process, the valve was turned to the extrusion position, in order to let the material exit through the die. The extrudate obtained was smooth and flexible at room temperature.

Example 6

Sulfonated Polysulfone/OED-400/Glass Fibers

This example was carried out using the PSUSNA compound used in Example 2, an oligooxyethylene-α,ω-diol with a weight of 400 g/mol OED-400 as a plasticizer, and glass fibers as filler. The mixture contained 38% by weight, namely 40% by volume, of plasticizer. In the PSUSNA+glass fibers fraction, the glass fibers represented 10% by volume relative to PSUSNA.

The PSUSNA/OED-400/glass fibers mixture was produced in a Rheomix mixer the same as that used in Example 2. The temperature of the mixer was set at 120° C. The rotational speed of the rotors was fixed at 80 rpm, which corresponded to an average shear of 80 s$^{-1}$.

22.58 g of PSUSNA, 14.0 g of OED-400 and 2.4 g of glass fibers were weighed separately to within 1 mg, then they were premixed by mechanical stirring before being poured into the hopper of the mixer. The rotors were activated for 20 minutes. The product obtained was a transparent liquid, of yellow color that was not very viscous at the temperature for producing the mixture, namely 120°. At room temperature, the product became a solid, it was homogeneous to the naked eye and to the scanning electron microscope.

The PSUSNA/OED-400/glass fibers mixture was milled in a mechanical cutting mill (sold under the trademark IKA) equipped with a 2 mm sieve. The grains recovered after milling were placed in a ventilated oven at 60° C. for 4 hours to remove the water which would hamper the extrusion.

The extrusion was carried out in the Microcompounder extruder, with a plate temperature Te of 140° C., and a duration De of 5 min.

The temperature of the mixture, measured in real time by the temperature sensor, remained at 140° C., which signified that the mixture was not overheated. The torque measured was 3 N·m, which is to say that the material flowed easily at 140° C. At the end of the mixing process, the valve was turned into the extrusion position, in order to let the material exit through the die. The extrudate obtained was smooth and flexible at room temperature.

Example 7

Sulfonated Polyetheretherketone, Sodium Salt/OED-400

This example was carried out using a sulfonated polyetheretherketone, sodium salt, as the polymer and OED-400 as a plasticizer. The mixture contained 51% by weight, namely 55% by volume, of plasticizer. The sulfonated polyetheretherketone, sodium salt, was prepared according to the following procedure.

50 g of polyetheretherketone sold by Goodfellow was dissolved in 500 ml of 96% sulfuric acid at room temperature, under an argon atmosphere. The dissolution was complete after 4 hours and resulted in a brown solution. Next, 146 ml of oleum with 20% of $SO_3$ was added to attain a sulfuric acid concentration equal to 98.5%. The reaction mixture was brought to a temperature of 45° C. and it was held at this temperature for 45 minutes. The reaction mixture was then slowly precipitated, with mechanical stirring, into 5 l of iced water. The precipitate was filtered, and it was washed several times with distilled water, until the pH of the distilled water used was reached. Next, the precipitate was dried under a dynamic vacuum of 10 mbar for 3 days at 60° C. Assaying was carried out in the presence of a colored indicator (Methyl Orange) by a $2.5 \times 10^{-3}$ mol/l solution of sodium hydroxide in DGME, by dissolving 1 g of dry polymer in 100 ml of diethylene glycol monomethyl ether (DGME). An IEC of 1.3 meq/g was obtained. The acid polymer thus obtained was transferred back into a 1 mol/l aqueous solution of sodium hydroxide and was stirred for 4 hours. The precipitate was then filtered, washed with distilled water to a neutral pH, then dried under a dynamic vacuum of 10 mbar for 2 days at 70° C.

The extrusion was carried out in the Microcompounder extruder, with a plate temperature Te of 140° C., and a duration De of 5 min, with a mixture containing 0.90 g of polyetheretherketone, sodium salt and 0.95 g of OED-400 was introduced into the extruder.

The temperature of the mixture, measured in real time by the temperature sensor, remained at 140° C., which signified that the mixture was not overheated. The torque measured was 2.5 N·m, which is to say that the material flowed easily at 140° C. At the end of the mixing process, the valve was turned to the extrusion position, in order to let the material exit through the die. The extrudate obtained was smooth and flexible at room temperature.

Example 8

Preparation of a Membrane

A membrane of the sulfonated polymer obtained according to Example 1 was prepared using an oligooxyethylene-α,ω-diol OED as a plasticizer. Various preparations were carried out with an OED-400 ($T_g=-78°$ C.), or with an OED-200 ($T_g=-86°$ C.).

Figure 12:
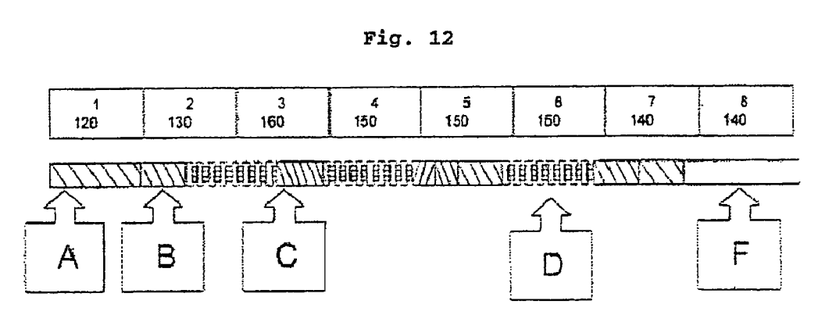
FIG. 12 represents a lateral view of the profile of one screw of the extruder used.

A co-rotating twin-screw extruder equipped with interlocking screws and a barrel (FIG. 11) was used. It made it possible to obtain narrow residence time distributions. The equilibrium of the pressures led to large torques, shear rates and flow rates. FIG. 12 represents a lateral view of the profile of one screw of the extruder used.

The screw profile comprises a feed zone A, three mixing zones (B) which make it possible to increase the residence time of the mixture in the extruder and to promote shearing, and three transport zones (C) to convey the mixture to a sheet die (D). The total length of the screw, is 640 mm.

The temperature profile along the screws is chosen so as to:
avoid degradation of the sulfonated polysulfone in zone (1);
avoid vaporization of the oligooxyethylene-α,ω-diol (2);
guarantee a homogenous mixing of the two components (3) to (6) by having a low viscosity; and
lower the viscosity of the mixture (7) and (8) to guarantee the behavior of the film on exiting the die.

The sulfonated polysulfone was introduced at the beginning of the feed zone (A). The sulfonated polysulfone feed rate was controlled by a weigh feeder. It was a hopper (not shown) placed on a balance (not shown) that made it possible to continuously measure the feed rate by weight loss. A regulator drove the rotational speed of the screws of the extruder, in order to obtain the desired throughput. The operating capacity of the weigh feeder was 2 kg and the throughput range available with the sulfonated polysulfone varied from 0.2 to 2.5 kg/h.

The OED was introduced at the end of the feed zone (A) using a volumetric pump.

The extrusion trials were carried out with the screw profile described above, using sulfonated polysulfones PSUNA having various levels of ionic groups, obtained according to the process of Example 1 by varying the proportions of sulfonating agents to obtain various levels of ionic groups, and by using either OED-200 or OED-400 as a plasticizer.

Measurements of ion conductivity were carried out on the membranes obtained according to the technique described in Example 2.

The degree of swelling of the membranes obtained by extrusion was determined according to the following process. An extruded membrane was immersed in a 0.5 mol/l solution of hydrochloric acid for 24 hours at room temperature to remove the plasticizer which dissolved in water and to acidify the membrane. The mass $M_o$ of the membrane was then determined by weighing. The membrane was then dried under a dynamic vacuum of mbars at 60° C. for 72 h. After cooling to room temperature, the mass of the membrane $M_1$ was again determined by weighing. The degree of swelling was $T_x = [(M_o - M_1)/M_1] \times 100/$.

The extrusion conditions and the results of the various trials are given in the following table. The conductivity C at 25° C., and 100% RH is expressed in mS/cm. The degree of swelling $T_x$ is given as a percentage.

| Trial | Type of OED OED-200 | OED-400 | Degree of OED % | PSUS IEC (meq/g) | C | $T_x$ |
|---|---|---|---|---|---|---|
| XTRU3 | | X | 10 | 1.22 | $7 \times 10^{-3}$ | 70 |
| XTRU7 | | X | 10 | 1.14 | $5 \times 10^{-3}$ | 50 |
| EX4 | | X | 30 | 1.39 | $4.61 \times 10^{-3}$ | 96 |
| EX7 | | X | 20 | 1.39 | $6.2 \times 10^{-3}$ | 83.5 |
| EX8 | X | | 20 | 1.39 | $4.1 \times 10^{-3}$ | 89 |
| EX10 | X | | 20 | 1.39 | $4.6 \times 10^{-3}$ | 82.5 |

The invention claimed is:
1. A process for preparing a membrane by extrusion of a thermoplastic polymer bearing alkaline ionic groups, comprising (a) preparing a mixture composed of a polymer having alkaline ionic groups corresponding to the formula $-A^{p-}(M^+)_p$ in which A represents the anionic part of the ionic group, p represents the valency of the anionic part and M represents an alkali metal and of at least one plasticizer, (b) extruding the mixture obtained to form a film, and (c) washing the film obtained in aqueous medium to remove said plasticizer(s), wherein the plasticizer(s) is (are) chosen from nonvolatile compounds which are stable with respect to the ionic groups of the polymer, which are soluble in water or in solvents that are miscible with water, and is (are) selected from the group consisting of:

i) oligoethers which optionally have terminal $CH_3$, OH or $NH_2$ groups;

ii) carboxylic amides corresponding to the formula $HCONR^6R^7$ in which $R^6$ and $R^7$ represent alkyl groups having from 1 to 4 carbon atoms or hydrogen atoms;

iii) sulfonic amides which bear alkyl groups or hydrogen atoms on the nitrogen atom;

iv) plasticizers having protic functional groups selected from the group consisting of alcohol, thiol, phenol, primary amine and secondary amine;

v) alkanols having at least 2 carbon atoms, polyols derived from alkanes by replacing at least two hydrogen atoms with an OH group, and compounds having ether groups;

vi) monoamine, diamine or triamine oligomers and in which the nitrogen atom bears from 1 to 3 oligo(oxyethylene) groups;

vii) the sulfamide $H_2N-SO_2-NH_2$, the sulfonamides $R^8-SO_2NH_2$ in which $R^8$ is an alkyl group which has from 1 to 5 carbon atoms, or an aryl group comprising one or more fused or unfused aromatic rings; and viii) primary or secondary amides.

2. The process as claimed in claim 1, wherein the alkaline ionic group is selected from the group consisting of $-O^-H^+$ groups, sulfonate $-SO_3^-M^+$ groups, sulfate $-OSO_3^-M^+$ groups, carboxylate $-CO_2^-M^+$ groups, thiocarboxylate $-C(=S)O^-M^+$ groups, dithiocarboxylate $-CS_2^-M^+$ groups, phosphonate $-PO_3^{2-}(M^+)_2$ groups, sulfonylamide $-SO_2NH^-M^+$ groups, sulfonylimide $(X-SO_2NSO_2-)^-M^+$ groups, in which X is an alkyl group, a perfluorinated or partially fluorinated alkyl group, an alkenyl group, a perfluorinated or partially fluorinated alkenyl group, an oxyalklene $CH_3-(O-(CH_2)_m)_n$ group in which $2 \leq m \leq 5$ and $1 \leq n \leq 10$, or an aryl group.

3. The process as claimed in claim 1, wherein the thermoplastic polymer is a polymer whose chain is composed of identical or different repeating units, each repeating unit comprising at least one functional group and at least one mononuclear or polynuclear aromatic group, the functional group being selected from the group consisting of ester, ketone, ether, sulfide, sulfone, benzoxazole, amide and imide groups, at least some of the aromatic groups bearing an alkaline ionic group.

4. The process as claimed in claim 1, wherein the thermoplastic polymer is a polymer which comprises segments chosen from the following segments in which the indices n, m, x and y each represent a number of repeating units:

a polyphenylene oxide corresponding to the formula I, in which R and $R_1$ represent independently of one another H, an alkyl group, an alkenyl group, or an aryl group comprising one or more fused or unfused aromatic rings and optionally bearing a substituent:

a polyetheretherketone corresponding to the formula II below a polyetherketone corresponding to the formula III below:

a polybenzoxazole whose repeating unit corresponds to the formula IV below:

a polyamic acid which is converted by the heat of extrusion to the polyimide (V) below:

a polyimide corresponding to the formula (V);

a polyparaphenylene comprising, for example, units corresponding to the formula (VI)

(VI)

a polyphenylene sulfide of which the repeating unit (VII) corresponds to the formula below:

(VII)

a polyether sulfone corresponding to the formula VIII below in which $R_2$ represents a single bond or a —C(CH$_3$)— group:

(VIII)

5. The process as claimed in claim 1, wherein the thermoplastic polymer comprises segments represented by the following formulae, in which —SO$_3$M, M being Na or Li:

(Ia)

(IIa)

(IIIa)

(IVa)

(Va)

(VIa)

(VIIa)

(VIIIa)

6. The process as claimed in claim 1, wherein the mixture of ionic thermoplastic polymer and plasticizer subjected to the extrusion further contains a filler.

7. The process as claimed in claim 6, wherein the filler is a filler capable of improving the mechanical strength of the polymer film obtained after extrusion.

8. The process as claimed in claim 7, wherein the filler is selected from the group consisting of glass fibers, carbon fibers, carbon nanotubes, cellulose microfibrils, alumina fibers and polyaramid fibers.

9. The process as claimed in claim 6, wherein the filler is phosphatoantimonic acid.

* * * * *